United States Patent
Kimbrell et al.

(10) Patent No.: US 10,247,894 B2
(45) Date of Patent: Apr. 2, 2019

(54) HIGH PRESSURE FULL CABLE STRENGTH MIDSPAN ACCESS SPLICE HOUSING

(71) Applicant: AFL TELECOMMUNICATIONS LLC, Duncan, SC (US)

(72) Inventors: Eddie Kimbrell, Dacula, GA (US); John Toth, Clermont, FL (US); Lou Guzzo, Inman, SC (US); Ted Lichoulas, Simpsonville, SC (US); Alan Knowlton, Swineshead (GB); Ed Austin, Hampshire (GB)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 15/552,735

(22) PCT Filed: Feb. 23, 2016

(86) PCT No.: PCT/US2016/019125
§ 371 (c)(1),
(2) Date: Aug. 22, 2017

(87) PCT Pub. No.: WO2016/137990
PCT Pub. Date: Sep. 1, 2016

(65) Prior Publication Data
US 2018/0031793 A1   Feb. 1, 2018

Related U.S. Application Data

(60) Provisional application No. 62/119,561, filed on Feb. 23, 2015.

(51) Int. Cl.
*G02B 6/44* (2006.01)
*G02B 6/50* (2006.01)
(Continued)

(52) U.S. Cl.
CPC .......... *G02B 6/4428* (2013.01); *G02B 6/4441* (2013.01); *G02B 6/4454* (2013.01);
(Continued)

(58) Field of Classification Search
USPC ........................................................ 385/135
See application file for complete search history.

(56) References Cited

U.S. PATENT DOCUMENTS 3,823,254 A * 7/1974 Smith ................. H02G 15/003
174/76
3,860,743 A * 1/1975 Worden ................. H02G 15/10
174/21 R
(Continued)

FOREIGN PATENT DOCUMENTS

WO   WO 2014/160787 A1   10/2014

OTHER PUBLICATIONS

AFL Telecommunications LLC; International Patent Application No. PCT/US2016/019125; International Search Report dated May 2, 2016; (1 page).

Primary Examiner — Kaveh C Kianni
(74) *Attorney, Agent, or Firm* — Dority & Manning, P.A.

(57) ABSTRACT

A pressure housing assembly according to exemplary aspects includes: a saddle assembly configured to encase a midpoint access section of a cable; and a pressure housing configured to be mounted on the saddle assembly. The saddle assembly has a first cable SSTL tube opening where a first seal member is provided; and a second cable SSTL tube opening where a second seal member is provided. The pressure housing has a corresponding first cable SSTL tube opening where a third seal member is provided; a second cable SSTL tube opening where a fourth seal member is provided; and a port configured to allow at least one penetrator to be inserted therethrough. The saddle assembly
(Continued)

comprises a seal block configured to at least partially surround the midpoint access section of the cable.

20 Claims, 13 Drawing Sheets

(51) Int. Cl.
  *H02G 1/00* (2006.01)
  *H02G 9/02* (2006.01)
(52) U.S. Cl.
  CPC ......... *G02B 6/4472* (2013.01); *G02B 6/4475* (2013.01); *G02B 6/506* (2013.01); *H02G 1/005* (2013.01); *H02G 9/02* (2013.01)

(56) References Cited

U.S. PATENT DOCUMENTS

| | | | | |
|---|---|---|---|---|
| 5,608,159 | A * | 3/1997 | Carcone | F16L 55/103 226/8 |
| 6,218,620 | B1 * | 4/2001 | Michel | H02G 15/013 174/92 |
| 7,353,601 | B1 * | 4/2008 | Bertini | H02G 1/16 29/857 |
| 7,641,395 | B2 * | 1/2010 | Ringgenberg | G02B 6/2558 385/53 |
| 9,696,509 | B2 * | 7/2017 | Kimbrell | G02B 6/443 |
| 2003/0062157 | A1 * | 4/2003 | Ahmed | B23K 20/004 166/242.6 |
| 2003/0072062 | A1 * | 4/2003 | Pedersen | G02B 6/4428 398/181 |
| 2003/0072063 | A1 * | 4/2003 | Adams, Sr. | G02B 6/4442 398/173 |
| 2003/0098064 | A1 * | 5/2003 | Kohli | E21B 33/1212 137/236.1 |
| 2003/0192707 | A1 * | 10/2003 | Guven | B23K 20/004 166/380 |
| 2005/0019190 | A1 * | 1/2005 | Lee | F04C 18/3564 418/23 |
| 2005/0185257 | A1 * | 8/2005 | Young | G02B 6/4428 359/333 |
| 2005/0189130 | A1 * | 9/2005 | Bertini | H01B 7/285 174/25 C |
| 2005/0191910 | A1 * | 9/2005 | Bertini | H01R 13/523 439/676 |
| 2005/0192708 | A1 * | 9/2005 | Bertini | H01B 7/285 700/265 |
| 2006/0204181 | A1 * | 9/2006 | Reynolds | G02B 6/3887 385/76 |
| 2007/0009214 | A1 | 1/2007 | Elkins, II et al. | |
| 2010/0303426 | A1 * | 12/2010 | Davis | E21B 47/011 385/95 |
| 2010/0303427 | A1 * | 12/2010 | Rambow | E21B 47/011 385/95 |
| 2011/0135247 | A1 * | 6/2011 | Achara | E21B 47/011 385/12 |
| 2014/0219620 | A1 * | 8/2014 | Jaaskelainen | G02B 6/4471 385/135 |
| 2014/0233898 | A1 * | 8/2014 | Kimbrell | G02B 6/4428 385/107 |
| 2016/0334579 | A1 * | 11/2016 | Park | G02B 6/4446 |
| 2016/0341924 | A1 * | 11/2016 | Park | G02B 6/4416 |

* cited by examiner ic # HIGH PRESSURE FULL CABLE STRENGTH MIDSPAN ACCESS SPLICE HOUSING

CROSS REFERENCE TO RELATED APPLICATIONS

This application is a National Stage Application of PCT/US2016/019125, filed on Feb. 23, 2016, which is based upon and claims the benefit of priority from U.S. Provisional Patent Application No. 62/119,561, filed Feb. 23, 2015, the disclosures of all of which are incorporated by reference herein in their entireties.

BACKGROUND

1. Technical Field

The present disclosure is related to a high pressure housing assembly, and more particularly, to a high pressure full cable strength midspan access splice housing which is applicable to subsea cable installation.

2. Description of the Related Art

Current subsea pressure housing designs require a system design or manufacturer to cut the cable in half, install armored terminations (or similar structures) on the cut cable ends, and requires integration of these terminated cable ends onto a pressure housing. Although this method is proven, it introduces additional interfaces and fiber splices into the system design, which collectively add to the expense and reliability of the assembly. Exemplary aspects of the present disclosure are related to providing a means to install a "High Pressure Full Cable Strength Midspan Access Splice Housing" assembly onto the cable, reducing hardware cost, improving system reliability, and improving operational flexibility.

SUMMARY

Exemplary implementation of the present disclosure address the problems and/or disadvantages of the related art technology described above. Although the present invention is not required to overcome all of the disadvantages described above, the exemplary implementations of the present disclosure may address the above disadvantages, and further disadvantages not described above, or may not overcome any of the problems listed above while still providing enhancement to the related art.

According to aspects of exemplary embodiments, there is provided: a pressure housing assembly comprising: a saddle assembly configured to encase a midpoint access section of a cable; and a pressure housing configured to be mounted on the saddle assembly, wherein the saddle assembly comprises a first cable component opening configured to allow a first cable component to be inserted therethrough, a first seal member provided at the first cable component opening; the saddle assembly comprises a second cable component opening configured to allow a second cable component to be inserted therethrough, a second seal member provided at the second cable component opening; the pressure housing comprises a first opening configured to allow the first cable component to be inserted therethrough, a third seal member provided at the first opening; the pressure housing comprises a second opening configured to allow the second cable component to be inserted therethrough, a fourth seal member provided at the second opening; the pressure housing comprises a third opening configured to allow at least one interconnect member to be inserted therethrough; and the saddle assembly comprises a seal block configured to at least partially surround the midpoint access section of the cable.

The pressure housing assembly of an exemplary embodiment may further be configured such that the saddle assembly comprises a seal washer provided adjacent to the seal block.

The pressure housing assembly of an exemplary embodiment may further be configured such that the cable retains full break strength and is not separated and rejoined during installation.

The pressure housing assembly of an exemplary embodiment may further be configured such that the first seal member is an elastomeric interference seal.

The pressure housing assembly of an exemplary embodiment may further be configured such that the second seal member is an elastomeric interference seal.

The pressure housing assembly of an exemplary embodiment may further be configured such that the pressure housing further comprises a fifth seal member provided at the first opening, the fifth seal member being a swage.

The pressure housing assembly of an exemplary embodiment may further be configured such that the pressure housing further comprises a sixth seal member provided at the first opening, the sixth seal member being a swage.

The pressure housing assembly of an exemplary embodiment may further be configured such that a first split wedge is provided at a first end of the pressure housing assembly; and a second split wedge is provided at a second end of the pressure housing assembly opposite the first end.

The pressure housing assembly of an exemplary embodiment may further be configured such that the saddle assembly at the second end has an interior shape complementary to the second split wedge.

The pressure housing assembly of an exemplary embodiment may further be configured such that an adjustable cable termination assembly is provided at the first end, wherein the adjustable cable termination assembly has an interior shape complementary to the first split wedge.

The pressure housing assembly of an exemplary embodiment may further be configured such that a first cable clamp is provided at the first end; and a second cable clamp is provided at the second end.

The pressure housing assembly of an exemplary embodiment may further be configured such that the first split wedge is accommodated in a first pocket such that first end armor wires of the cable are fixed to the first split wedge; and the second split wedge is accommodated in a second pocket such that second end armor wires of the cable are fixed to the second split wedge.

The pressure housing assembly of an exemplary embodiment may further be configured such that the saddle assembly comprises an upper saddle and a lower saddle.

The pressure housing assembly of an exemplary embodiment may further be configured such that the seal block comprises a lower saddle seal block and an upper saddle seal block configured to wrap around the midpoint access section of the cable and portions of a cable core outer jacket of the cable.

The pressure housing assembly of an exemplary embodiment may further be configured such that a seal washer is provided adjacent to the seal block; a first cable clamp is provided at a first end of the pressure housing assembly; and a second cable clamp provided at the second end of the pressure housing assembly opposite to the first end, wherein the seal block comprises a lower saddle seal block, an upper saddle seal block, an upper saddle first termination end seal block, and an upper saddle second termination end seal block; the upper saddle seal block is installed between the first cable clamps and the second cable clamp the upper saddle second termination end seal block is installed between the second cable clamp and the seal block washer; and the upper saddle first termination end seal block is installed between the first cable clamp and a saddle assembly wall.

The pressure housing assembly of an exemplary embodiment may further be configured such that at least one splice tray is provided in the pressure housing.

The pressure housing assembly of an exemplary embodiment may further be configured such that mounting flanges are provided configured to attach at least one interconnect cable thereto.

The pressure housing assembly of an exemplary embodiment may further be configured such that the saddle assembly comprises an upper saddle, a lower saddle, and an upper saddle to pressure housing support bracket.

According to another exemplary embodiment of the present invention, there is provided a communications system comprising: the pressure housing assembly as described above; the cable; a riser entry terminal connected to the cable; and at least one node, the at least one node connected to the pressure housing assembly via the at least one interconnect member.

The communications system of an exemplary embodiment may further be configured such a loop back splice housing is connected to the cable.

BRIEF DESCRIPTION OF THE DRAWINGS

The above and other aspects of the present invention will become more apparent from the following description of exemplary embodiments, taken in conjunction with the accompanying drawings of which.

DETAILED DESCRIPTION OF EXEMPLARY EMBODIMENTS

Figure 1:
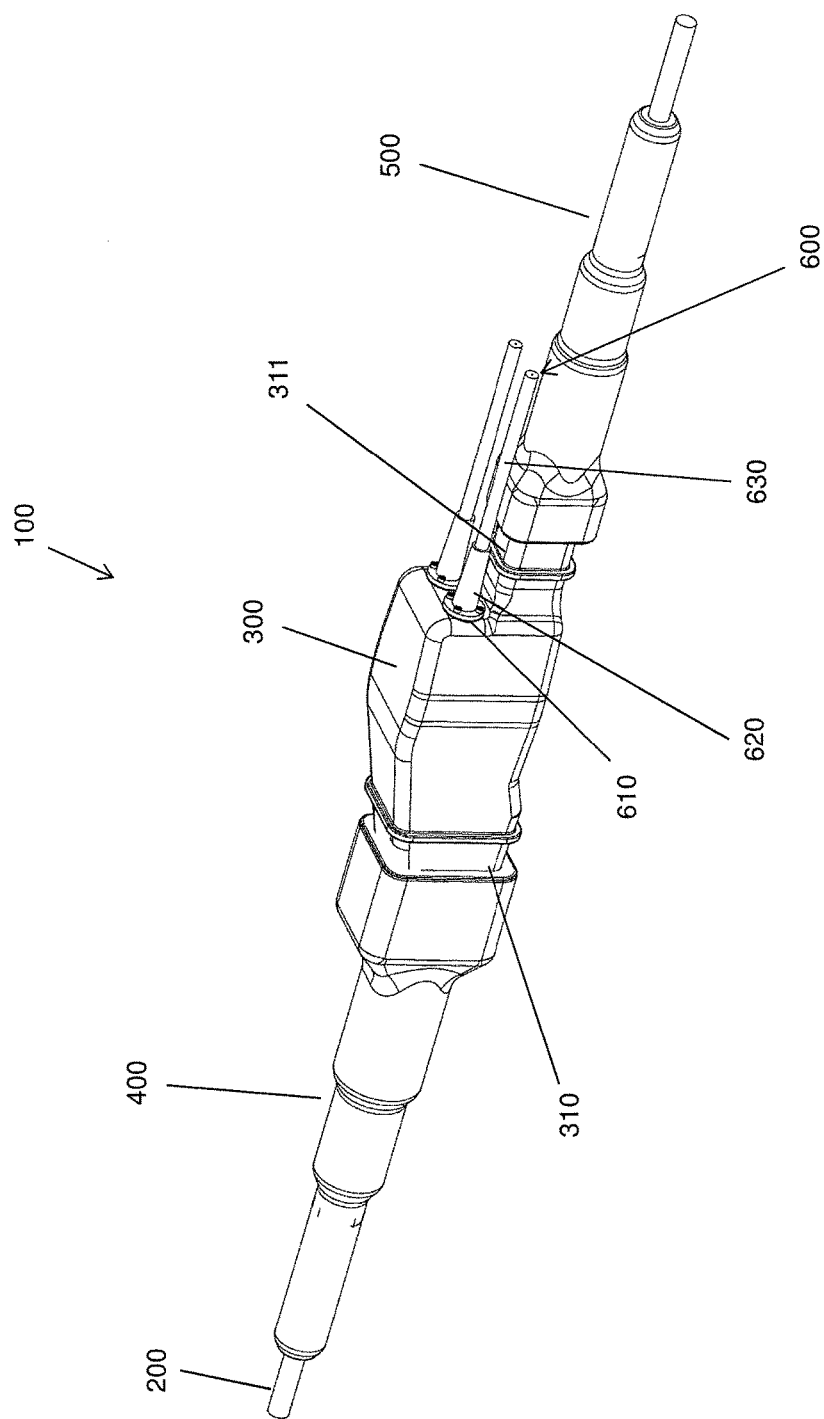
FIG. 1 is an isometric view of a high pressure full cable strength midspan access splice housing assembly according to a first embodiment.

Hereinafter, exemplary embodiments will be described in greater detail with reference to the accompanying drawings.

In the following description, same reference numerals are used for the same elements when they are depicted in different drawings. Elements are described in detail in order to assist in an understanding of exemplary embodiments. Thus, it is apparent that exemplary embodiments may be carried out without those specifically-defined elements. Detailed descriptions of known elements are omitted for clarity and conciseness.

An exemplary embodiment will be described below which is a fiber optic subsea cable. However, a plethora of electric and fiber optic or hybrid cable constructions may be used with the "High Pressure Full Cable Strength Midspan Access Splice Housing" depending on system requirements.

A high pressure full cable strength midspan access splice housing consistent with exemplary aspects of the present disclosure may have the following objectives.

First, to provide a means to install a high pressure splice housing onto a midspan access point of a subsea cable without having to cut the cable in half at the access point, or reduce the cable tensile strength.

Second, to provide a means to connect the conductors (electrical wires or optical fibers) of a subsea cable to a node (control hub, sensor station, etc.) via interconnect cables exiting the pressure housing. Specifically, it is possible to simultaneously provide leading and trailing conductors with room-pressure housing for an optical/electronic assembly.

Third, to provide a method to establish redundant communication or power supply on the ocean bottom using the high pressure full cable strength midspan access splice housing.

FIG. 1 shows an isometric view of a "High Pressure Full Cable Strength Midspan Access Splice Housing" according to a first embodiment of the present disclosure. FIG. 1 shows a fully overmolded "High Pressure Full Cable Strength Midspan Access Splice Housing", or assembly 100.

The assembly 100 shown in FIG. 1 shows a cable 200, assembly overmold 300, leading strain relief 400, trailing strain relief 500, and interconnect cables 600.

In the first embodiment, the cable 200 may be a subsea cable.

The assembly overmold 300 covers a saddle assembly 700 and pressure housing 800 which are overmolded in a polyurethane or polyethylene overmold. A polyurethane overmold may use a two-part castable polyurethane; a polyethylene overmold may use a two-part castable material or an injection molded thermoplastic. The overmold serves three main purposes: provides a corrosion barrier for the underlying saddle assembly 700 and pressure housing 800; provides features for shipboard handling and deployment (such as recess 310 and recess 311 for facilitating deployment or attaching handling straps); and provides a backup pressure seal. Furthermore, depending on the material of the saddle assembly 700 and pressure housing 800, the overmold may or may not be provided.

The leading strain relief 400 may be an overmolded, extruded, or injection molded strain relief which is applied to prevent the cable 200 from exceeding a bend limit during handling or deployment. A polyurethane overmolded strain relief boot is shown, for example, in FIG. 1. The leading strain relief 400 may be configured to be longer than the trailing strain relief 500 since it is assumed that the leading strain relief 400 will contact the ocean bottom on an overboard deployment. The leading strain relief 400 and the trailing strain relief 500 may also be symmetric. The strain relief boots may be molded in situ or as separate components and attached to the main overmold of the assembly overmold 300 and/or cable 200. The material may be a natural or synthetic rubber compound, thermoplastic elastomer, or other compliant material.

The trailing strain relief 500 may be an overmolded, extruded, or injection molded strain relief which is applied to prevent the cable 200 from exceeding a bend limit during handling or deployment. A polyurethane overmolded strain relief boot is shown, for example, in FIG. 1.

The interconnect cables 600 may comprise two sets of pressure vessel penetrations (with mounting flanges 610, strain reliefs 620, and oil-filled hoses 630), as shown in FIG. 1. Each penetration and oil filled hose is connected to the underlying pressure housing 800 at one end, and connected to a wetmate or drymate connector at the other end. Alternately, the oil filled hoses may be replaced with a small subsea cable terminated with a high reliability armored termination/epoxy gland on one or both ends or with a wetmate or drymate connector on the other end.

Figure 2:
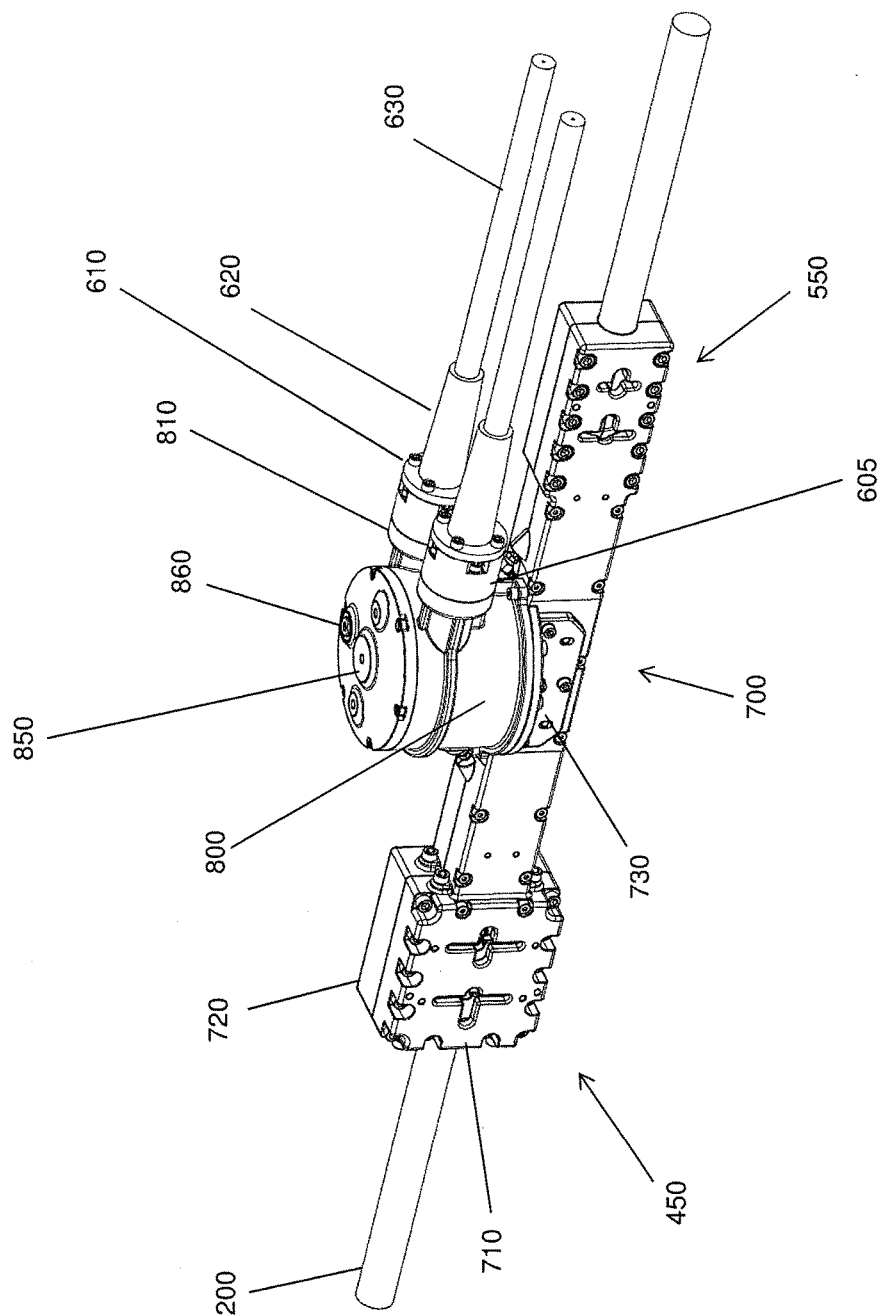
FIG. 2 is an isometric view of the assembly according to the first embodiment with the overmold removed.

FIG. 2 shows an isometric view of the "High Pressure Full Cable Strength Midspan Access Splice Housing" of the first embodiment with the overmold of the assembly overmold 300, the leading strain relief 400, and the trailing strain relief 500 removed.

The saddle assembly 700 comprising three components (an upper saddle 710, lower saddle 720, and upper saddle to pressure housing support bracket 730) encases the midpoint access section of the cable 200.

The pressure housing 800 is mounted to the center of the saddle assembly 700. The two interconnect cables 600 (pressure housing penetrations with mounting flanges 610, strain reliefs 620, and oil-filled hoses 630) are connected to the pressure housing 800 at pressure housing mounting flanges 810. Isolators 605 may be provided, for example, if the interconnect cables 600 and the pressure housing 800 are not made of the same material to prevent adverse effects of dissimilar metals contacting each other. Additionally, the pressure housing 800 comprises a pressure housing lid 850 and a purge plug 860

The material of the saddle assembly components and pressure housing may be high strength stainless steel, for example 17 PH 1025, or titanium.

An adjustable cable termination end 450 is on the same side of the assembly 100 as the leading strain relief 400. A fixed cable termination end 550 is on the same side of the assembly 100 as the trailing strain relief 500. It shall be understood that the disposition of the ends could be reversed.

Figure 3:
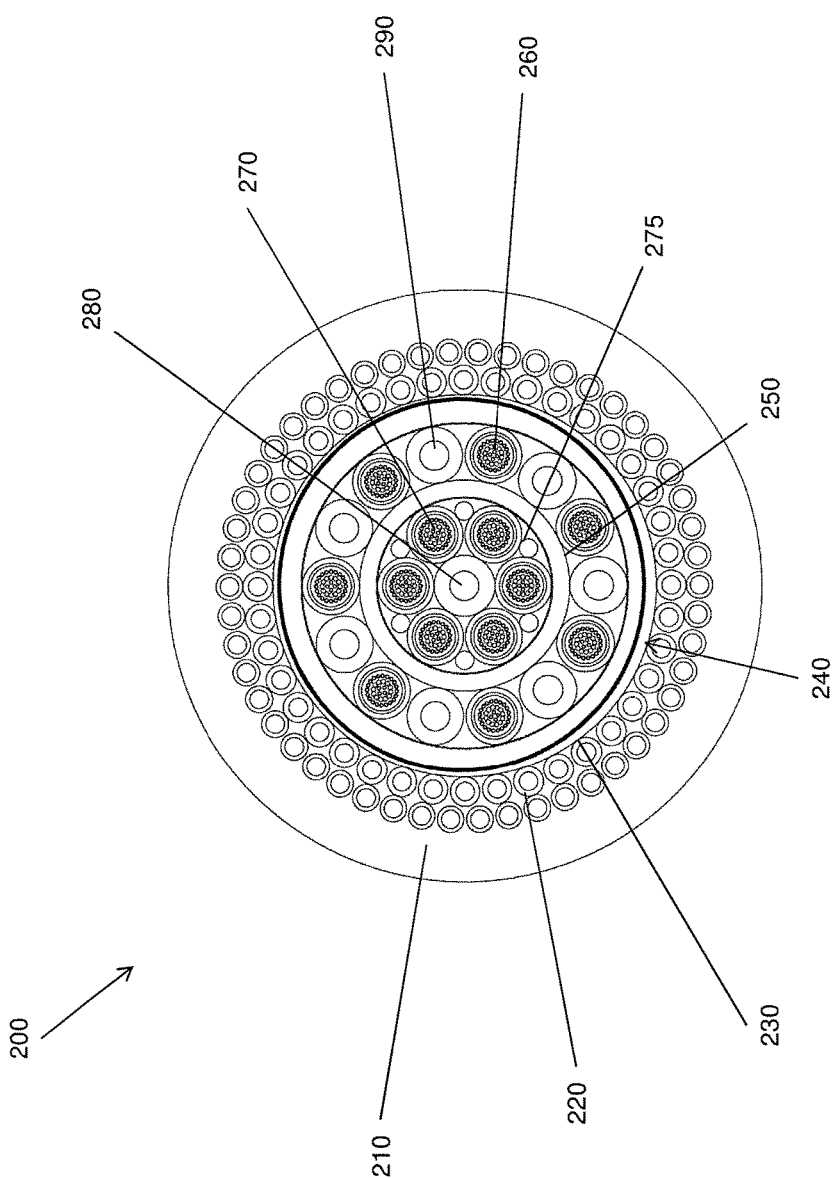
FIG. 3 is a cross-sectional view of a cable according to the first embodiment.

FIG. 3 shows a cross-sectional view of the design of an exemplary cable 200 used with the first embodiment, which is a subsea cable. As previously noted, while a subsea cable is described merely as an example, a plethora of electric and fiber optic or hybrid cable constructions could also be used.

The cable 200 comprises cable outer jacket 210, which may be a polyurethane, hytrel, or polyethylene sheath. The cable outer jacket 210 can be applied to both electrical and optical cables.

Cable armor layer 220 is provided, which comprises jacketed or unjacketed steel wires which give the cable 200 the majority of its tensile strength and twist resistance. Many subsea cables have two contra helically wrapped armor wire layers. The cable armor layer 220 can be applied to both electrical and optical cables.

A cable core outer jacket 230 is provided, which may be a polymeric jacket, for example, polyethylene, which acts as a water barrier, which in turn provides corrosion resistance to the contents of cable core 240 from high pressure water. The cable core outer jacket 230 can be applied to both electrical and optical cables.

The cable core 240 comprises the protected interior of the subsea cable that may contain any combination of stainless tubes containing optical fibers, jacketed copper conductors, filler rods, armor wires, and strength members.

A cable core inner jacket 250 may be provided. Depending on system requirements, a cable core may have an inner and outer section separated by the cable core inner jacket 250. The cable core inner jacket 250 may be a polymeric material, for example, polyethylene, acting as a water barrier that provides corrosion resistance to the underlying contents.

The cable core 240 may contain outer SSTL tubes 260 and inner SSTL tubes 270, which may be jacketed or unjacketed stainless steel tubes containing optical fibers. These tubes are present in a fiber optic or hybrid optic-electric subsea cable. Cable armor wires 290 may be provided with the SSTL tubes.

Filler rods 275 may also be provided in the cable core 240. The filler rods 275 comprise polymeric rods which are incorporated in a cable bundle to help maintain element packing in the cable core 240 under hydrostatic loading. The filler rods 275 may be applied to both electrical and optical cables. Alternatively, a filler material may be used to fill the interstitial spaces in a cable.

Finally, the cable core 240 may comprise a central strength member 280, which is a jacketed or unjacketed armor wire used for cable stranding (build) and cable strength.

Figure 4:
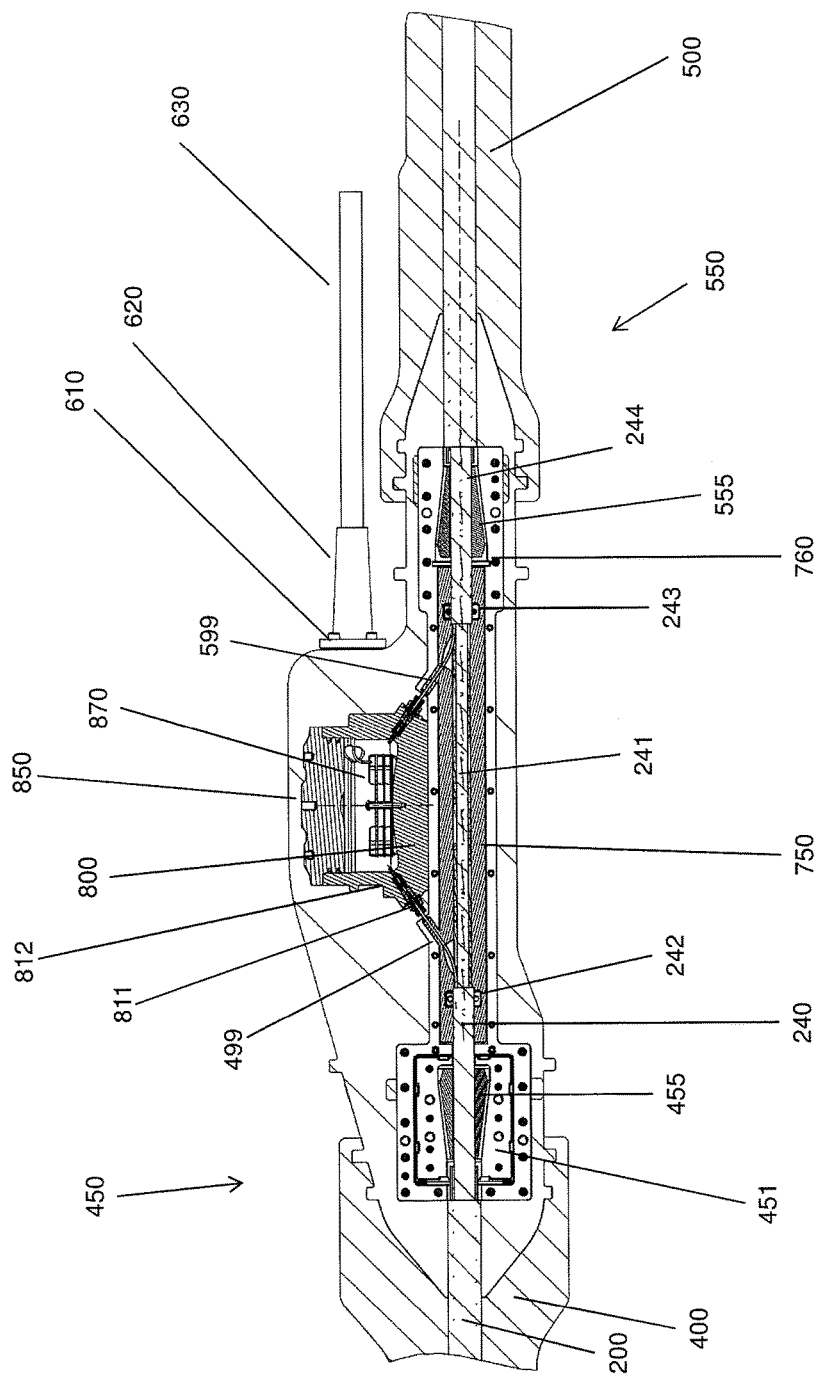
FIG. 4 is a cross-sectional view of the assembly according to the first embodiment.

FIG. 4 shows a cross-sectional view of the assembly 100.

Regarding cable preparation, the cable outer jacket 210 is removed from the midpoint access region 244. The outer armor layer wires of the cable armor layer 220 are cut at both ends, leaving sufficient length to bend the armor wires over the conical surface of split wedges 455 and 555. A midspan section of the cable core jacket 230 is removed to provide access to the underlying tube bundle 241. In the first embodiment, one SSTL tube from each end is cut and unwound from the tube bundle for eventual connection to the pressure housing 800. This is shown in more detail in FIG. 5.

As shown in FIG. 4, at the adjustable cable termination end 450, there is provided an adjustable cable termination assembly 451. The adjustable cable termination assembly 451 accommodates the split wedge 455 having a round center bore, which is clamped onto the cable core 240 at the leading strain relief end of the assembly 100. The armor wires of the cable armor layer 220 are then broomed over the split wedge 455. The split wedge 455 with broomed cable armor wires is encased in the two halves of the adjustable cable termination assembly 451. The adjustable cable termination assembly 451 has an interior geometry that is complementary to the split wedge 455, forcing the cable armor wires to be trapped between the exterior of the split wedge 455 and the interior of the adjustable cable termination assembly 451, thereby fixing the ends of the cut cable armor wires. This space is filled with a filled epoxy resin such as Socketfast for added tensile strength. The adjustable cable termination assembly 451 is then placed in a pocket in the upper and lower saddle 710, 720. This pocket configured to be is larger than the overall adjustable cable termination assembly 451 and allows the cable termination assembly 451 to be axially adjusted using jacking screws 452 to preload the cable and remove any slack in the armor wires.

At the fixed cable termination end 550, the split wedge 555 with a round center bore is clamped onto the cable core 240 at the trailing strain relief end of the assembly 100. The armor wires of the cable armor layer 220 are then broomed over the split wedge 555. The split wedge 555 with broomed cable armor wires is encased in the two halves of the upper and lower saddle 710, 720. The trailing strain relief end of the upper and lower saddle 710, 720 has an interior geometry that is complementary to the split wedge 555, forcing the cable armor wires to be trapped between the exterior of the split wedge 555 and the upper and lower saddle pocket. This space is filled with a filled epoxy resin such as Socketfast for added tensile strength.

The midspan cable core is encased in a seal block. The seal block may be divided into several discrete components for ease of assembly, such as lower saddle seal block 750 and upper saddle seal block 751. The cut and unwound SSTL tubes are inserted through a hole or a slit in the lower saddle seal block 750 prior to exiting the saddle assembly 700 through an opening. It should be noted that a seal washer (for example, seal washer 497) is placed between the seal block section containing the cut and unwound SSTL tubes and the opening of the saddle assembly 700, thereby creating a Morrison seal that reseals the cable core jacket ends and the tube bundle 241.

It shall be noted that a Morrison seal is a type of elastomeric interference seal which may be used in subsea cables. Alternative to a Morrison seal, any type of seal that can act as a radial compression or stretch seal could be similarly implemented. Such a seal is compliant and dynamic in that as the outside pressure increases, so does the amount of pressure exerted on the seal interface. Such an elastomeric seal may be made up of an elastomeric hollow cylinder piece and at least one seal washer. In addition to a hollow cylinder piece, a piece which is not necessarily axially symmetric but has a longitudinal channel to accommodate a central axis member and which is pliant enough to effectively surround the central axis member when compressed could be alternately provided. Furthermore, a plurality of pieces could be provided which collectively surround the central axis member when compressed. These pieces may be elastic members. In operation, the seal washer abuts an end of the elastomeric piece and provides a rigid surface for the elastomeric piece to press against. The seal washer facing the external high pressure source axially presses against the elastomeric piece, which is confined in a corresponding bore. When the components experience outside high pressure, the washer presses against the elastomeric member, causing it to bulge outward which then effects a tighter seal against circumferential surfaces of the bore.

At either ends of the inner tube bundle 241, there are provided cable clamps 242, 243. The two cable clamps 242, 243 grip the cable core outer jacket 230. These clamps provide protection against the pistoning of the cable core jacket inwards. Additionally, the cable clamps 242, 243 provide a secondary anti-rotation protection.

At the fixed cable termination end 550, a seal block split washer 760 is provided. This washer provides a mechanical separation between the fixed end split wedge 555 and the seal block. The interior features of the upper and lower saddle 710, 720, and the seal block split washer 760 provide the volumetric boundary of the lower saddle seal block 750 and upper seal block 751, and act as an anti-extrusion barrier. This washer is made in two pieces and fits around the uncut cable core outer jacket 230.

The pressure housing 800 is fastened to the center of the saddle assembly 700. Each of the opposing end SSTL tubes (leading cable SSTL tube 499 and trailing cable SSTL tube 599) enter the pressure housing 800 via a dual layer tube seal consisting of a swage and a Morrison seal. In FIG. 4, swage 811 and Morrison seal 812 for the leading cable SSTL tube 499 are shown. Housed inside the pressure housing 800, three stacked splice trays 870 are shown, however, any suitable number of splice trays can be provided. The pressure housing lid 850 is fastened onto the top of the pressure housing 800 and has two sets of O-rings and backup rings for sealing.

Figure 5:
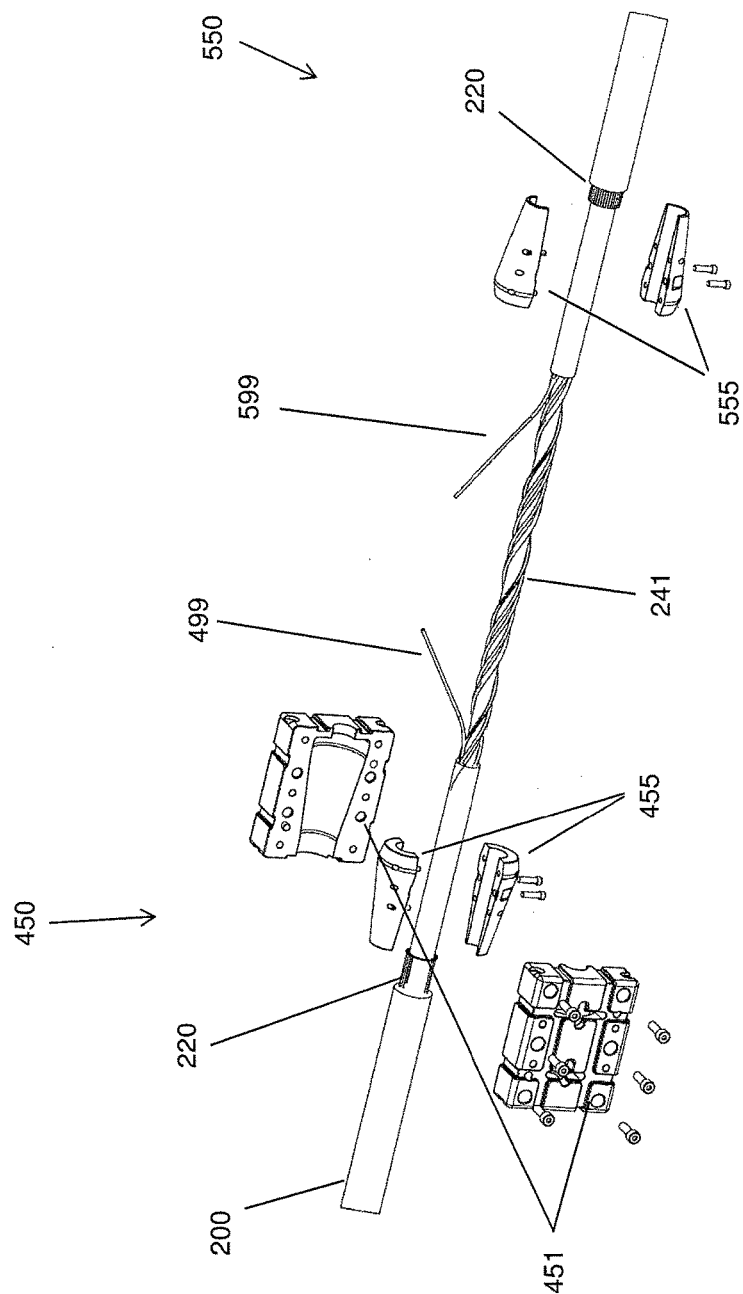
FIG. 5 is an isometric view of the assembly according to the first embodiment showing cable preparation and attachment of the terminations.

FIG. 5 shows an isometric view of the assembly 100 showing the cable preparation and attachment of the terminations (fixed and adjustable). FIG. 5 does not show the armor wires of the cable armor layer 220 broomed over the split wedges 455, 555; the wires are shown in a truncated view for clarity.

As shown in FIG. 5, the split wedges 455, 555 are provided in halves and can be assembled with fasteners. The adjustable cable termination assembly 451 is also provided in halves and assembled with fasteners.

Figure 6:
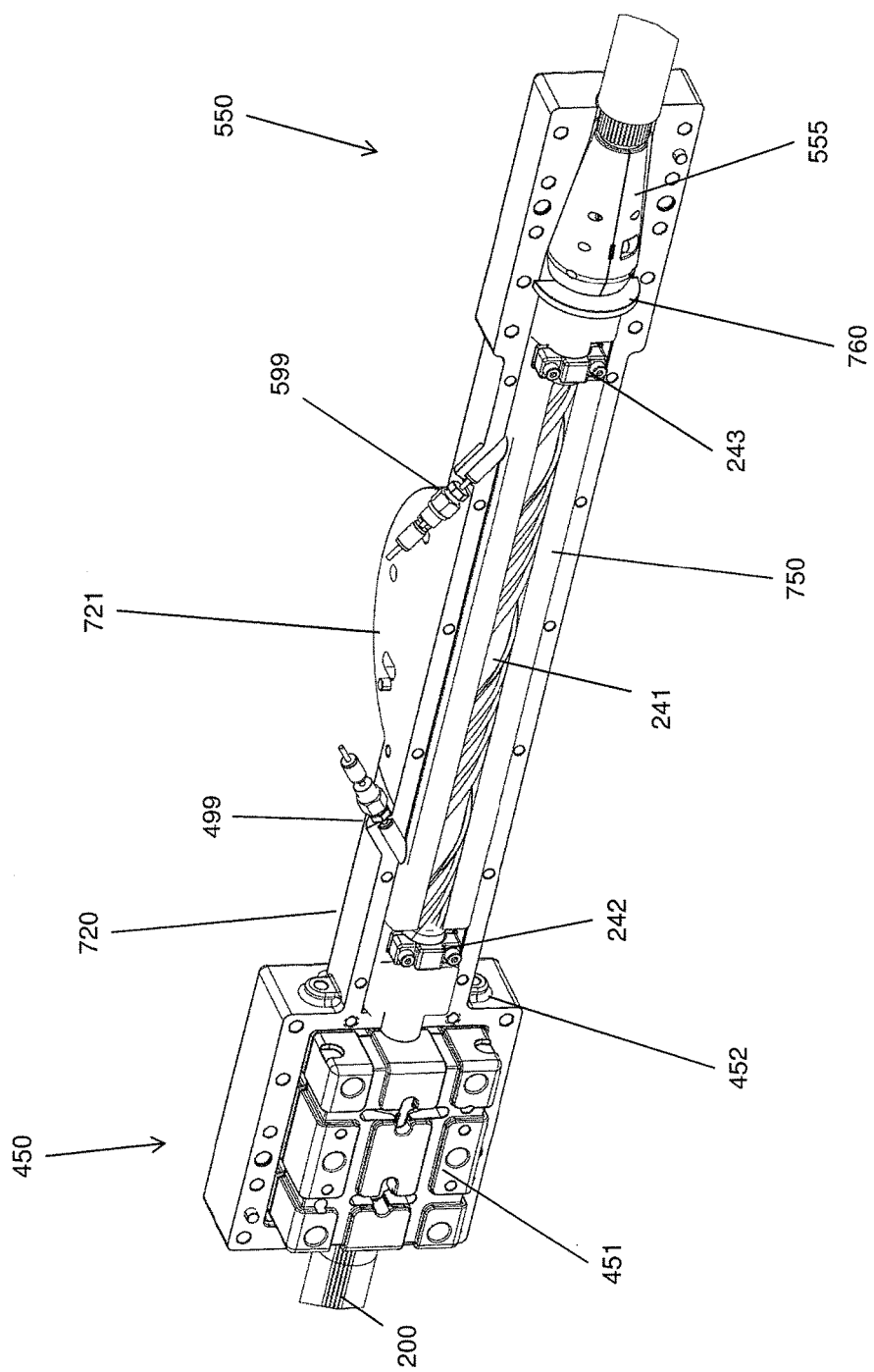
FIG. 6 is an isometric view showing an assembly of the lower saddle according to the first embodiment.

FIG. 6 shows an isometric view showing the assembly of the lower saddle 720. FIG. 6 shows a lower saddle pressure housing fixed support bracket 721, which is integral with the lower saddle 720. Also shown are jacking screws 452 for adjustable cable termination assembly 451, of which, four may be provided, for example.

Figure 7:
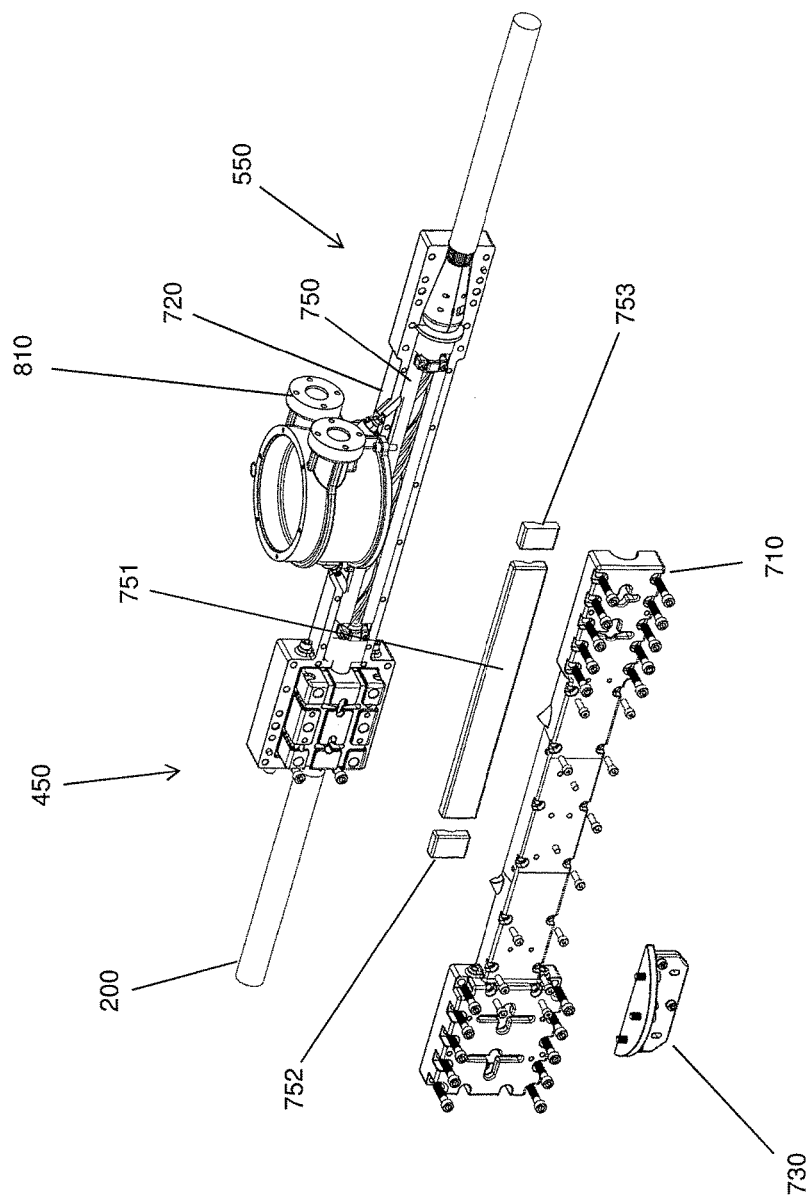
FIG. 7 is an isometric view showing the saddle assembly according to the first embodiment.

FIG. 7 shows an isometric view of the saddle assembly 700.

As shown in FIG. 7, the upper saddle to pressure housing support bracket 730 is fastened to the upper saddle 710 with a plurality of fasteners. When thee upper and lower saddle 710, 720 are fastened together, the cable midpoint access region 244 is encased by the saddle assembly 700, and fixation of cut ends of the armor wires of the cable armor layer 220 via the split wedges 455, 555 and inner surfaces of their corresponding cavities forms a tensile path through the saddle assembly 700 such that the cable retains full break strength. Furthermore, when the upper and lower saddle 710, 720 are fastened together, upper saddle to pressure housing support bracket 730, together with the lower saddle pressure housing fixed support bracket 721, provides a mounting surface for the pressure housing 800.

A seal block sealing system will now be described with reference to FIG. 7.

As described previously, the lower saddle seal block 750 encases the cable tube bundle 241, and cut and unwound SSTL tubes and a portion of the cable core outer jacket on each end of the prepared cable section. At the upper saddle 710, three separate upper saddle seal blocks (upper saddle seal block 751, upper saddle adjustment cable termination end seal block 752, and upper saddle fixed cable termination end seal block 753) are provided to wrap around the cable tube bundle 241 and the portions of the cable core outer jacket. The seal blocks 751, 752, 753 are installed on top of the lower saddle seal block 750. The upper saddle seal block 751 is installed between the two cable clamps 242, 243. The upper saddle fixed cable termination end seal block 753, is installed between the cable clamp 243 and the seal block split washer 760. The upper saddle adjustable cable termination end seal block 752 is installed between the cable clamp 242 and saddle assembly wall. There is an integral compression web connecting the outer ends of the lower saddle seal block 750 to the center section of the lower saddle seal block 750. This web is provided to re-seal the cable core outer jacket 230 when coupled with the three upper seal blocks 751, 752, 753.

Figure 8:
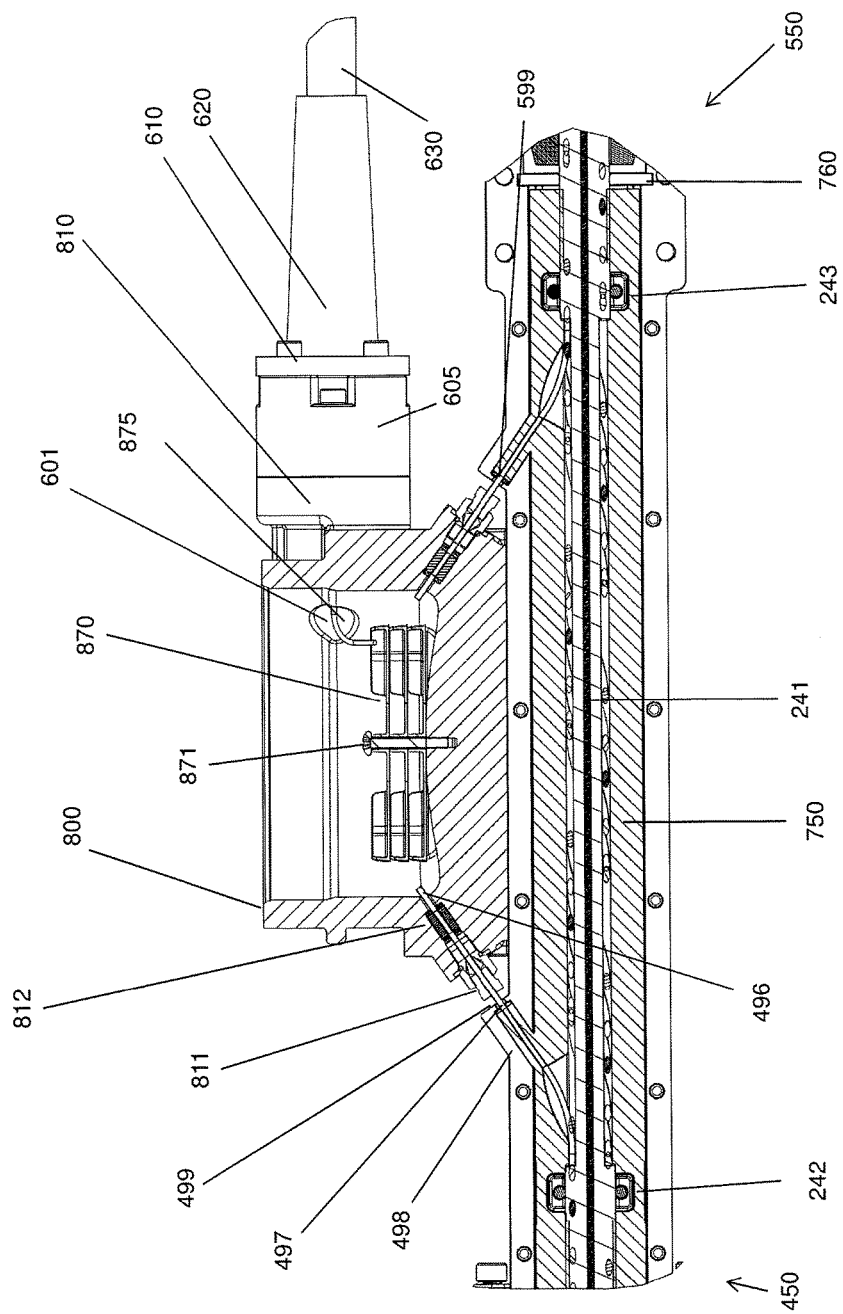
FIG. 8 is a cross-sectional view of the pressure housing according to the first embodiment.

FIG. 8 shows a detailed cross-section of the pressure housing 800.

As shown in FIG. 8, the SSTL tube entry point into the pressure housing 800 is provided with two layers of leak protection: for example, swage 811 and Morrison seal 812, which are labeled for the leading cable SSTL tube 499 at leading cable SSTL tube entry point 496. A swage and Morrison seal are also provided for the trailing cable SSTL tube 599. The Morrison seal 812 comprises an elastic tube member and two washers.

There is provided an opening in the saddle assembly 700 at the adjustable cable termination end 450 through which the leading cable SSTL tube 499 may be inserted. At the point where the leading cable SSTL tube 499 exits from the saddle assembly 700 at the adjustable cable termination end 450, there is provided a cable SSTL tube seal 498 and a cable SSTL tube seal washer 497 at the opening. The tube seal portion 498 may be integral with the lower saddle seal block 750. A similar arrangement is provided at the trailing cable SSTL tube 599 exit point from the saddle assembly.

Three stacked splice trays 870 are shown housed within the pressure housing 800. These trays are fastened to the pressure housing 800 using a retaining fastener 871.

There are two pass through ports 875 or channels on the center of the pressure housing mounting flanges 810. Each of these ports or channels allows conductors and optical fibers from the interconnect cables 600 (which may also be called penetrator tubes) to enter the pressure housing interior. A conductor 601 is shown fed in through one of the pass through ports 875 to connect to a splice tray of the splice trays 870. The conductor 601 is routed through one of the oil-filled hoses 630 into the pressure housing 800.

As previously mentioned, if the penetrator and the pressure housing 800 are not made of the same material, it may be necessary to install a polymeric isolator 605 between the penetrator body and the pressure housing 800 to prevent cathodic/galvanic corrosion. The isolator may be made of a high strength seawater resistant polymer such as glass filled Ultem (PEI) resin or glass filled PEEK. The corresponding fasteners should be made of the same material as the base material in which they are coupled to when fastened.

Figure 9:
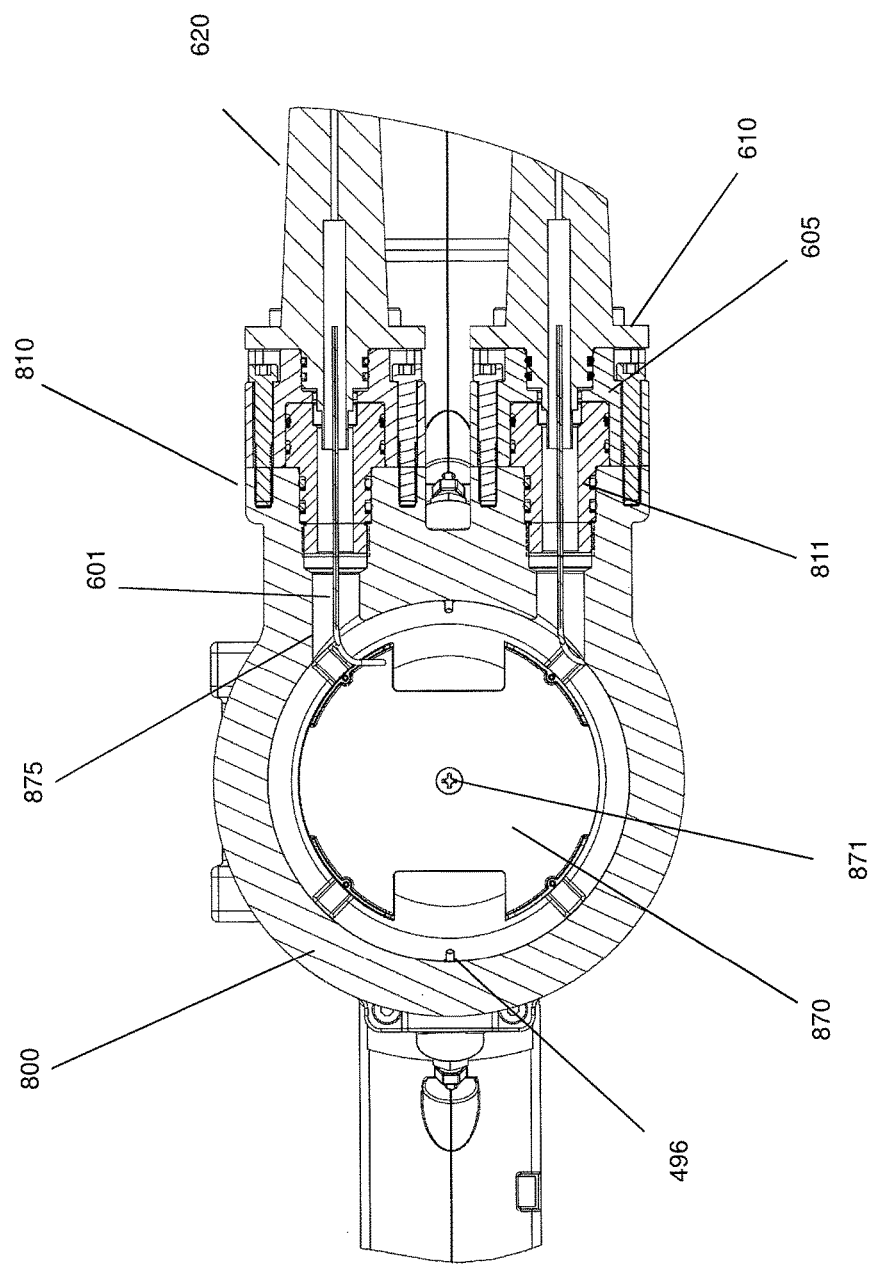
FIG. 9 is an overhead cross-sectional view of the pressure housing according to the first embodiment.

FIG. 9 shows an overhead detailed cross-sectional view of the pressure housing 800.

As shown in FIG. 9, the penetrators via penetrator mounting flanges 610 and strain reliefs 620 are installed into and fastened to the isolators 605. The isolator 605 is then fastened directly to the pressure housing mounting flanges 810. A penetrator flange adapter 811 is installed between the isolator 605 and the pressure housing mounting flanges 810. Dual sets of O-rings and backup rings are installed at all leak paths. Alternatively, a high reliability armored termination/epoxy gland can be installed onto the pressure housing flange 810. This provides for an alternative branching construction using interconnect cable.

A communication scheme using a "High Pressure Full Cable Strength Midspan Access Splice Housing" assembly according to the first embodiment will now be described.

Figure 10:
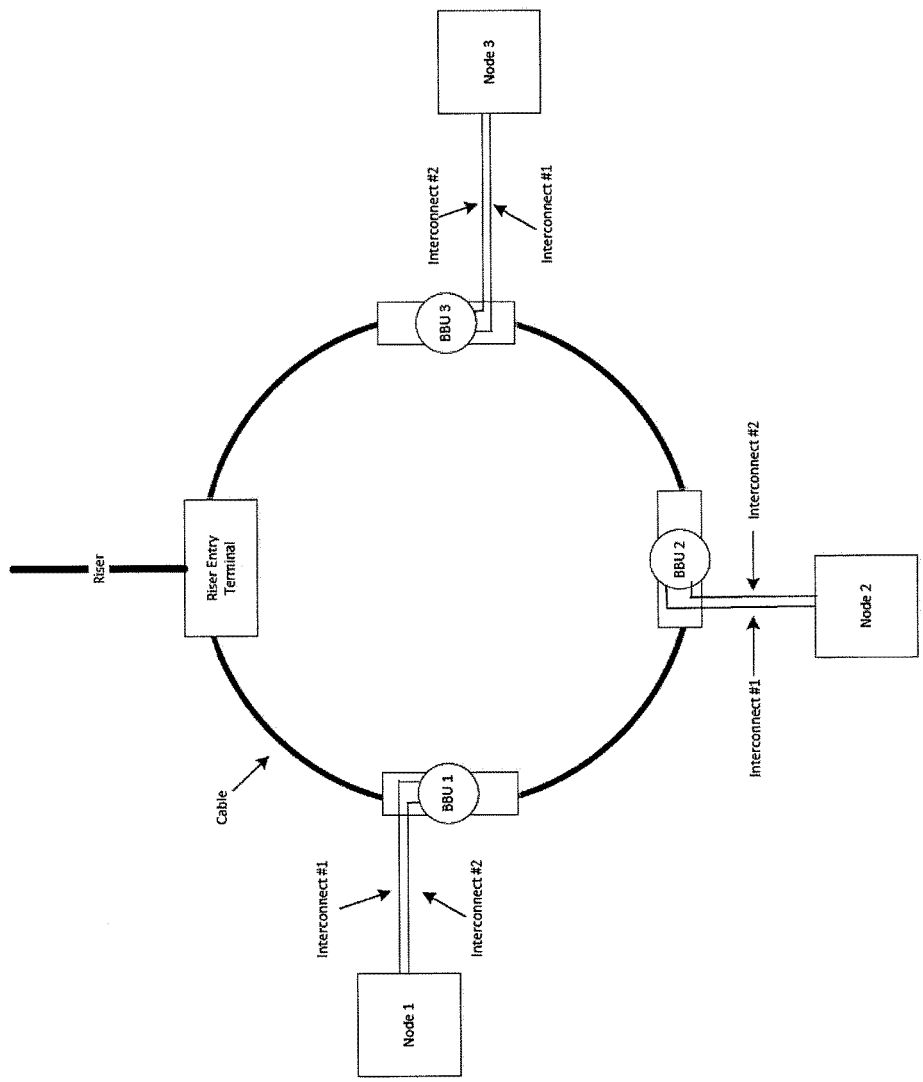
FIG. 10 is a schematic view of a first exemplary communication scheme.

FIG. 10 shows a schematic of a ring structure for subsea communication according to a first exemplary communication scheme. It shall be appreciated that although a fiber optic solution is shown, the methodology can be applied to electrical systems.

In the first exemplary communication scheme, there is provided a riser. A riser cable connects from a ship, platform, or Floating Production Storage and Offloading (FSPO) vessel on the surface. There is also provided a riser entry terminal, and the riser is optically connected to the cable at the riser entry terminal.

The cable shown in FIG. 10 is a subsea cable conceptually similar to the cable 200 shown in FIG. 3, as discussed with regard to the first embodiment. "BBU" represents a "High Pressure Full Cable Strength Midspan Access Splice Housing" assembly, for example, assembly 100 as in the first embodiment, which is installed along the cable. Three BBUs, BBU 1, BBU 2, and BBU 3, are shown in the first exemplary communication scheme depicted in FIG. 10. Nodes 1 through 3 are also shown which may be control hubs, sensor stations, lines, or the like. For each of the nodes, interconnects #1 and #2 are interconnect cables or oil-filled hoses which communicate the pressure housing of the respective BBU to the nodes. The interconnect cables or oil-filled hoses may be terminated with wet mate connectors, dry mate connectors, or high reliability armored termination/epoxy glands.

Figure 11:
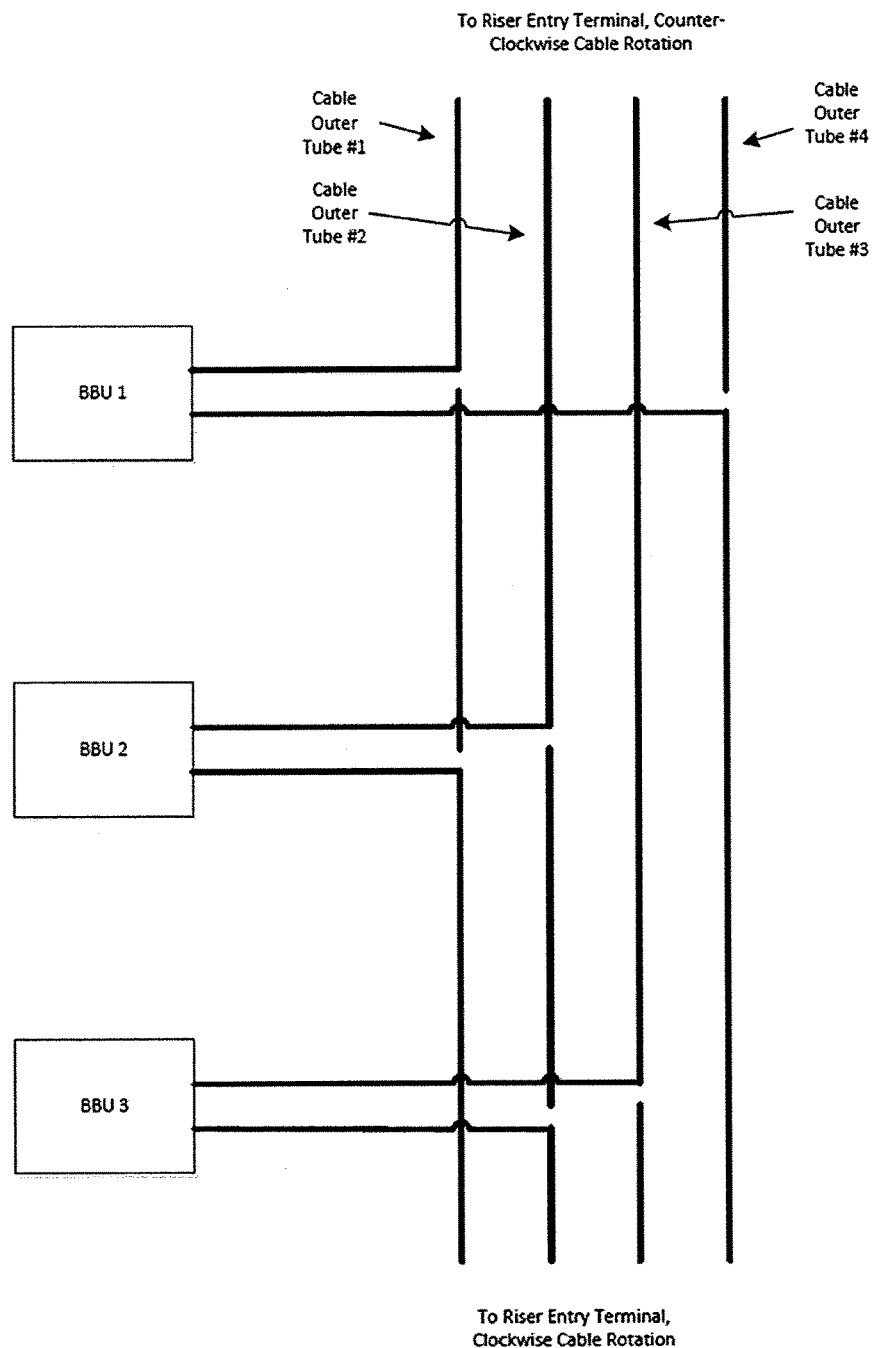
FIG. 11 is splicing diagram corresponding to the first exemplary communication scheme.

FIG. 11 shows a corresponding splicing diagram for the communication scheme shown in FIG. 10.

In FIG. 11, a redundant communication scheme is shown. For this scheme, two independent signal or power paths are provided to each BBU. In the first exemplary communication scheme, the signal or power paths are from opposite directions. In the presented example, a 4-tube cable is used.

Figure 12:
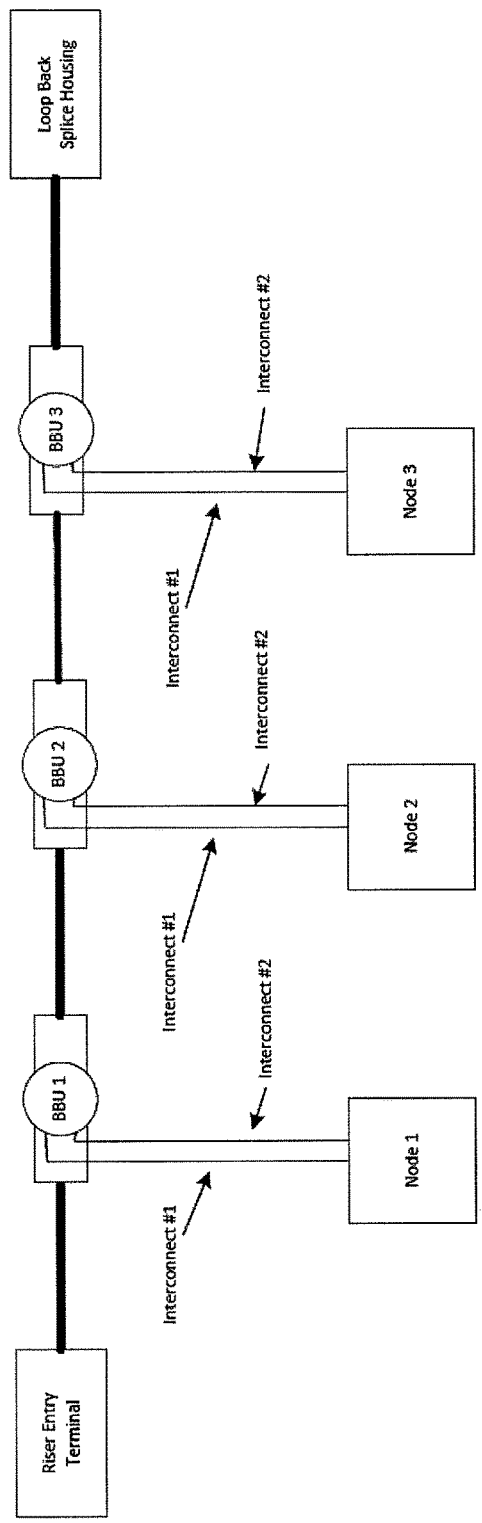
FIG. 12 is a schematic view of a second exemplary communication scheme.

FIG. 12 shows a schematic of a linear structure for subsea communication according to a second exemplary communication scheme. It shall be appreciated that although a fiber optic solution is shown, the methodology can be applied to electrical systems.

In the second exemplary communication scheme, an entry terminal is provided where a riser is optically connected to the cable. The cable may be a subsea cable conceptually similar to what is shown in FIG. 3. Similar to the first exemplary communication scheme, three BBUs, BBU 1, BBU 2, and BBU 3, are shown in the second exemplary communication scheme. Nodes 1 through 3 are shown which may be control hubs, sensor stations, lines, or the like. For each of the nodes, interconnects #1 and #2 are interconnect cables or oil-filled hoses which communicate the pressure housing of the respective BBU to the nodes. The interconnect cables or oil-filled hoses may be terminated with wet mate connectors, dry mate connectors, or high reliability armored termination/epoxy glands. The second exemplary communication scheme includes a loopback splice housing, which is a splice housing that optically connects outer tube fibers to inner tube fibers. The structure according to the second exemplary communication scheme provides bidirectional redundancy.

Figure 13:
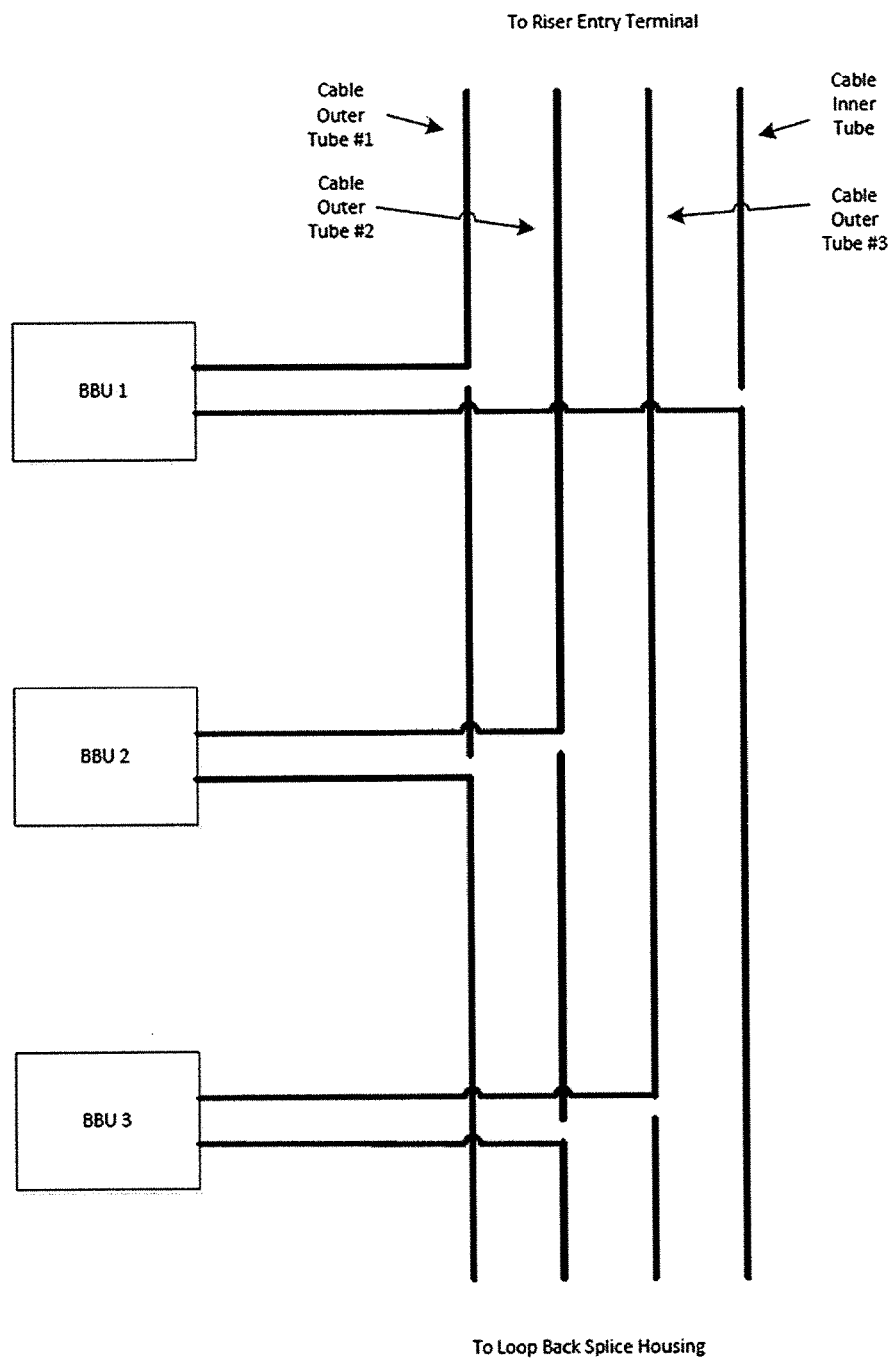
FIG. 13 is a splicing diagram corresponding to the second exemplary communication scheme.

FIG. 13 shows a corresponding splicing diagram for the communication scheme shown in FIG. 12.

In FIG. 13, a redundant communication scheme is shown. For this scheme, two independent signal or power paths are provided to each BBU. In the second exemplary communications scheme, one signal or power path is provided from the riser entry terminal via the cable outer tubes and a second signal or power path is provided from the riser entry terminal via the opposite end cable outer tubes by way of the cable inner tubes. In the presented example a 3-outer tube and 1-inner tube cable is used.

According to the above described exemplary embodiments, various advantages may be obtained, which include, but are not limited to the following.

1. Full cable strength midspan access—the cable remains unbroken and continuous, reducing loss and enabling larger scale implementation. For example, a midspan access point can be made without the cable being completely severed.

2. Scalable design—can be customized for different cable structures or cable types.

3. Redundant sealing of accessed cable core.

4. Redundant sealing of pressure housing penetrations.

5. Configurability—interconnect cables and/or oil-filled hoses terminated with wetmate connectors, drymate connectors, and armored terminations/epoxy glands can be installed into pressure housing.

6. Integral handling and deployment features.

7. Enabler of redundant communication architectures.

The foregoing description of the exemplary embodiments is intended to be illustrative. Many alternatives, modifications, and variations will be apparent to those skilled in the art. Descriptions and features listed in relation to the foregoing exemplary embodiments are not to be construed as limiting the present inventive concept, the scope of which is defined by the following claims.

What is claimed is:

1. A pressure housing assembly comprising:
a saddle assembly configured to encase a midpoint access section of a cable; and
a pressure housing configured to be mounted on the saddle assembly,
wherein:
the saddle assembly comprises a first cable component opening configured to allow a first cable component to be inserted therethrough, a first seal member provided at the first cable component opening;
the saddle assembly comprises a second cable component opening configured to allow a second cable component to be inserted therethrough, a second seal member provided at the second cable component opening;
the pressure housing comprises a first opening configured to allow the first cable component to be inserted therethrough, a third seal member provided at the first opening;
the pressure housing comprises a second opening configured to allow the second cable component to be inserted therethrough, a fourth seal member provided at the second opening;
the pressure housing comprises a third opening configured to allow at least one conductor to be inserted therethrough;
the saddle assembly comprises an upper saddle and a lower saddle; and
the saddle assembly comprises a seal block, the seal block comprises a lower saddle seal block and an upper saddle seal block configured to wrap around the midpoint access section of the cable and portions of a cable core outer jacket of the cable.

2. The pressure housing assembly of claim 1, wherein the saddle assembly comprises a seal washer provided adjacent to the seal block.

3. The pressure housing assembly of claim 1, wherein the pressure housing and saddle are configured such that the cable retains full break strength and is not separated and rejoined during installation.

4. The pressure housing assembly of claim 1, wherein the first seal member is an elastomeric interference seal.

5. The pressure housing assembly of claim 4, wherein the second seal member is an elastomeric interference seal.

6. The pressure housing assembly of claim 1, wherein the pressure housing further comprises a fifth seal member provided at the first opening, the fifth seal member being a swage.

7. The pressure housing assembly of claim 6, wherein the pressure housing further comprises a sixth seal member provided at the first opening, the sixth seal member being a swage.

8. The pressure housing assembly of claim 1, further comprising:
a first split wedge provided at a first end of the pressure housing assembly; and
a second split wedge provided at a second end of the pressure housing assembly opposite the first end.

9. The pressure housing assembly of claim 8, wherein the saddle assembly at the second end has an interior shape complementary to the second split wedge.

10. The pressure housing assembly of claim 9, further comprising:
an adjustable cable termination assembly provided at the first end,
wherein the adjustable cable termination assembly has an interior shape complementary to the first split wedge.

11. The pressure housing assembly of claim 10, further comprising:
a first cable clamp provided at the first end; and
a second cable clamp provided at the second end.

12. The pressure housing assembly of claim 8, wherein:
the first split wedge is accommodated in a first pocket such that first end armor wires of the cable are fixed to the first split wedge; and
the second split wedge is accommodated in a second pocket such that second end armor wires of the cable are fixed to the second split wedge.

13. The pressure housing assembly of claim 1, further comprising:
a seal washer provided adjacent to the seal block;
a first cable clamp provided at a first end of the pressure housing assembly; and
a second cable clamp provided at the second end of the pressure housing assembly opposite to the first end,
wherein:
the seal block comprises an upper saddle first termination end seal block and an upper saddle second termination end seal block;
the upper saddle seal block is installed between the first cable clamp and the second cable clamp;
the upper saddle second termination end seal block is installed between the second cable clamp and the seal block washer; and
the upper saddle first termination end seal block is installed between the first cable clamp and a saddle assembly wall.

14. The pressure housing assembly of claim 1, further comprising at least one splice tray provided in the pressure housing.

15. The pressure housing assembly of claim 1, further comprising mounting flanges configured to attach at least one interconnect cable thereto.

16. The pressure housing assembly of claim 1, wherein the saddle assembly comprises an upper-saddle-to-pressure-housing support bracket.

17. A communications system comprising:
the pressure housing assembly of claim 1;
a riser optically connected to the cable at a riser entry terminal; and at least one node, the at least one node connected to the pressure housing assembly via the at least one conductor.

18. The communications system of claim 17, further comprising a loop back splice housing connected to the cable.

19. A pressure housing assembly comprising:
a saddle assembly configured to encase a midpoint access section of a cable;
a pressure housing configured to be mounted on the saddle assembly;
a first split wedge provided at a first end of the pressure housing assembly, the first split wedge accommodated in a first pocket such that first end armor wires of the cable are fixed to the first split wedge; and
a second split wedge provided at a second end of the pressure housing assembly opposite the first end, the second split wedge accommodated in a second pocket such that second end armor wires of the cable are fixed to the second split wedge;
wherein:
the saddle assembly comprises a first cable component opening configured to allow a first cable component to be inserted therethrough, a first seal member provided at the first cable component opening;
the saddle assembly comprises a second cable component opening configured to allow a second cable component to be inserted therethrough, a second seal member provided at the second cable component opening;
the pressure housing comprises a first opening configured to allow the first cable component to be inserted therethrough, a third seal member provided at the first opening;
the pressure housing comprises a second opening configured to allow the second cable component to be inserted therethrough, a fourth seal member provided at the second opening;
the pressure housing comprises a third opening configured to allow at least one conductor to be inserted therethrough;
the saddle assembly comprises a seal block configured to at least partially surround the midpoint access section of the cable.

20. A communications system comprising:
the pressure housing assembly of claim 19;
a riser optically connected to the cable at a riser entry terminal; and
at least one node, the at least one node connected to the pressure housing assembly via the at least one conductor.

* * * * *